United States Patent [19]

Nutting

[11] 4,005,966
[45] Feb. 1, 1977

[54] BLOW MOLDING MACHINE

[75] Inventor: Robert G. Nutting, Glenview, Ill.

[73] Assignee: Continental Can Company, Inc., New York, N.Y.

[22] Filed: May 16, 1975

[21] Appl. No.: 578,020

[52] U.S. Cl. ............................ 425/326 B; 425/441; 425/DIG. 232; 425/DIG. 233

[51] Int. Cl.[2] ......................................... B29C 17/07

[58] Field of Search ......... 425/DIG. 233, DIG. 232, 425/DIG. 206, DIG. 211, DIG. 14, 326 B, 342, 440, 441, 436, DIG. 203

[56] References Cited
UNITED STATES PATENTS

| 2,784,452 | 3/1957 | Rueckberg et al. | 425/326 B |
| 3,541,640 | 11/1970 | Stefaniak et al. | 425/DIG. 232 |
| 3,621,525 | 11/1971 | Butcher | 425/326 B |
| 3,753,641 | 8/1973 | Turner et al. | 425/326 B |
| 3,856,450 | 12/1974 | Britten | 425/DIG. 203 |
| 3,912,435 | 10/1975 | Waring | 425/326 B |

Primary Examiner—Richard B. Lazarus
Attorney, Agent, or Firm—Diller, Brown, Ramik & Wight

[57] ABSTRACT

This disclosure relates to an apparatus for blow molding articles of the type having a plurality of split mold moving along a continuous path in which pairs of mold bodies define a mold chamber in which an extruded parison is inflated to a desired configuration, the improvement being the formation of each mold body in the form of first and second relatively slidable mold sections operable through cam follower and linkage means for sliding the sections relative to each other for increasing the predetermined configuration of the mold chamber to facilitate the release of the blown articles as well as scrap from the mold chambers.

15 Claims, 10 Drawing Figures

BLOW MOLDING MACHINE

It is relatively conventional to provide blow molding machines in which a plurality of molds are conveyed along a predetermined continuous path in what might be best termed a ferris-wheel mode. Each mold is generally composed of a pair of mold bodies which collectively in the closed position thereof define a chamber contoured to the desired size and configuration of an article to be blow molded therein. While the mold bodies are in the opened position a tubular parison of thermal plastic material is extruded, the molds are closed, and a portion or segment of the extruded parison is clamped off and inflated by compressed air injected thereinto through a blow needle. After the blown article has cooled sufficiently to maintain its desired shape the mold bodies are moved to an open position and the article is subsequently discharged in a conventional manner.

Within the last several years each mold half of a blow mold or at least one half of a pair of blow molds has been segmented in order to facilitate the removal of integrally molded articles therefrom. This is particularly true in the manufacture of blow molded containers which in recent years have been extensively redesigned to eliminate earlier more conventional flat bottoms, which generally preclude ejection diffuculties, to more sophisticated designs, such as deeply outwardly opening concaved bottoms, "daisy" bottoms, thinned bottoms and the like. In conventional non-segmented molds the deeply concave bottoms paresent undercuts which if sufficiently deep would cause article damage or deformation upon being ejected from the mold cavities. Such undesirable conditions were recognized and over the years there have been developed what might be best termed "segmented" molds in which each conventional mold half or mold body or at least one thereof is composed of two relatively movable parts or sections. The concept of this change over standard two piece molds was simply that of increasing either the length, width and/or area of the desired mold cavity to readily free the blown articles prior to ejection. For example, if a container, bottle or jug having a deeply recessed bottom were molded in a conventional two piece mold and ejected the bottom would be in many cases distorted. However, if the overall length of the mold cavity could be increased prior to ejection the undercut of the ejected containers would have no influence whatever upon the ejection step and the latter-noted disadvantages would be precluded. Therefore in most cases where there is involved undercuts or intricate designs in the finally formed blown article it has become commonplace to form each mold half in segmented sections to permit the normal closed size and configuration of the cavity or chamber to be increased, generally both in length and width, in order to eject the articles without distortion or deformation.

In keeping with the foregoing, it is a primary object of this invention to provide a novel blow molding machine in which the normal predetermined configuration (length and/or width) of a blow mold cavity or chamber is altered to facilitate without deformation the removal of articles therefrom, the invention being particularly characterized in the provision of at least one mold body or a pair of mold bodies which include relatively movable mold sections which after the "setting" or solidification of the blown article are relatively moved to at least increase the length thereof to facilitate the ejection of the blown articles from the associated blow mold chamber or cavity.

In further keeping with this invention one or both of a pair of mold bodies defining a blow mold cavity are formed as first and second relatively slidable mold sections, linkage means are coupled between the mold sections, and cam and cam follower means are provided for coacting through the linkage means for imparting relative sliding movement between the mold sections to move the same between opened and closed positions such that in the open position articles are readily ejected therefrom.

In further accordance with this invention means are provided for sequentially opening the mold sections of each pair of molds, as opposed to the simultaneous opening thereof, and preferably at least one mold section is moved to enlarge the mold cavity prior to the conventional opening of the latter by the separation of the pair of mold bodies.

Still another object of this invention is to provide the novel successive opening of the mold body sections by a cam follower which moves in a cam track, and further providing torsion spring means for rotating an associated shaft coupled to the cam follower and the linkage means for urging the mold sections to their closed position during the closed position of the molds to assure proper blow molding of the articles from the parisons disposed therein.

Yet another object of this invention is to provide a novel blow molding apparatus of the type heretofore described wherein means are provided for both ejecting a blown molded article from the separated mold bodies or halves and also ejecting scrap from between adjoining blow molded bodies.

Still another object of this invention is to provide a shear pin between associated crank arms carrying the cam followers and shafts coupled to the linkage means of the mold sections in order that a jamming which may occur during the operation of the blow molding machine will not result in damage to the various mechanisms associated with the opening and closing or relative movement between the mold sections.

With the above and other objects in view that will hereinafter appear, the nature of the invention will be more clearly understood by reference to the following detailed description, the appended claimed subject matter, and the several views illustrated in the accompanying drawings. IN THE DRAWINGS FIG. 1 is a schematic side elevational view of a novel blow molding apparatus constructed in accordance with this invention, and illustrates the manner in which mold halves and sections thereof are opened and closed during a blow molding operation.

Figure 1:
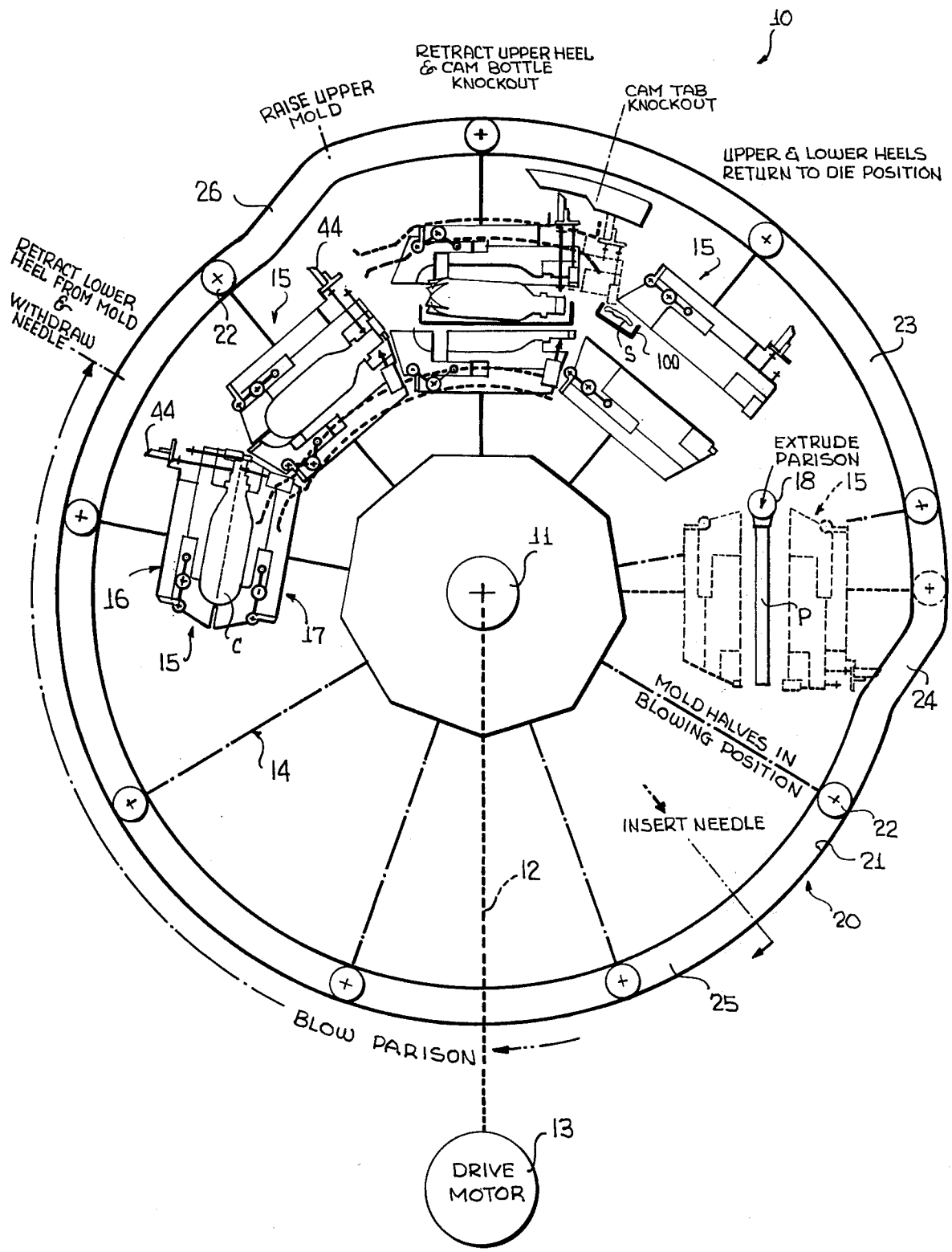

A novel apparatus or machine for blow molding articles is designated in FIG. 1 by the reference numeral 10 and includes a conventional frame (not shown) in which is journaled for rotation a shaft 11 rotated through a conventional drive chain 12 from a conventional motor 13. The shaft 11 imparts clockwise rotation to a main rotatable frame 14 of the ferris-wheel type supporting a plurality of identical molds, each designated by the reference numeral 15.

Each mold 15 includes mold halves 16, 17, the latter of which is supported adjacent to the shaft 11 and the former of which is supported remote therefrom. Thus, during the rotation of the shaft 11 the molds 15 rotate clockwise, as viewed in FIG. 1, between the illustrated 3:00 o'clock position at which the mold halves 16, 17 are in open position to permit a tubular parison P of plastic material to be extruded therebetween from a conventional extruder 18.

During the travel of the molds 15 from the 3:00 o'clock position means, generally designated by the reference numeral 20, in the form of a cam track 21 and a roller cam follower 22 carried by, each mold half 16 is brought to a closed position during which time each tubular parison P is blow molded to form a tubular container or article C. The cam track 21 includes a portion 23 which is radially spaced a maximum distance from the shaft 11 at which time the mold halves 16, 17 are opened, a next succeeding incline position 24 which causes the mold halves 16, 17 to move toward each other to a closed position, another minimum diameter cam track portion 25 which maintains the mold halves 16, 17, closed, and another inclined position 26 which merges with the cam track portion 23 to relatively move the mold halves 16, 17 to the opened position which is generally betwen 11:00 o'clock and 3:00 o'clock, as viewed in FIG. 1. Thus, during the operation of the blow molding machine 10 the mold halves 16, 17 of each mold are closed to clamp a portion of the parison P therebetween at generally the 4:00 o'clock position, thereafter each parison P is molded to the configuration of the articles C, and at approximately the 11:00 o'clock position the mold halves 16, 17 of each mold 15 are opened for the subsequent ejection of each container C from between the mold halves 16, 17 at the 12:00 o'clock position, again as viewed in FIG. 1.

Figure 2:
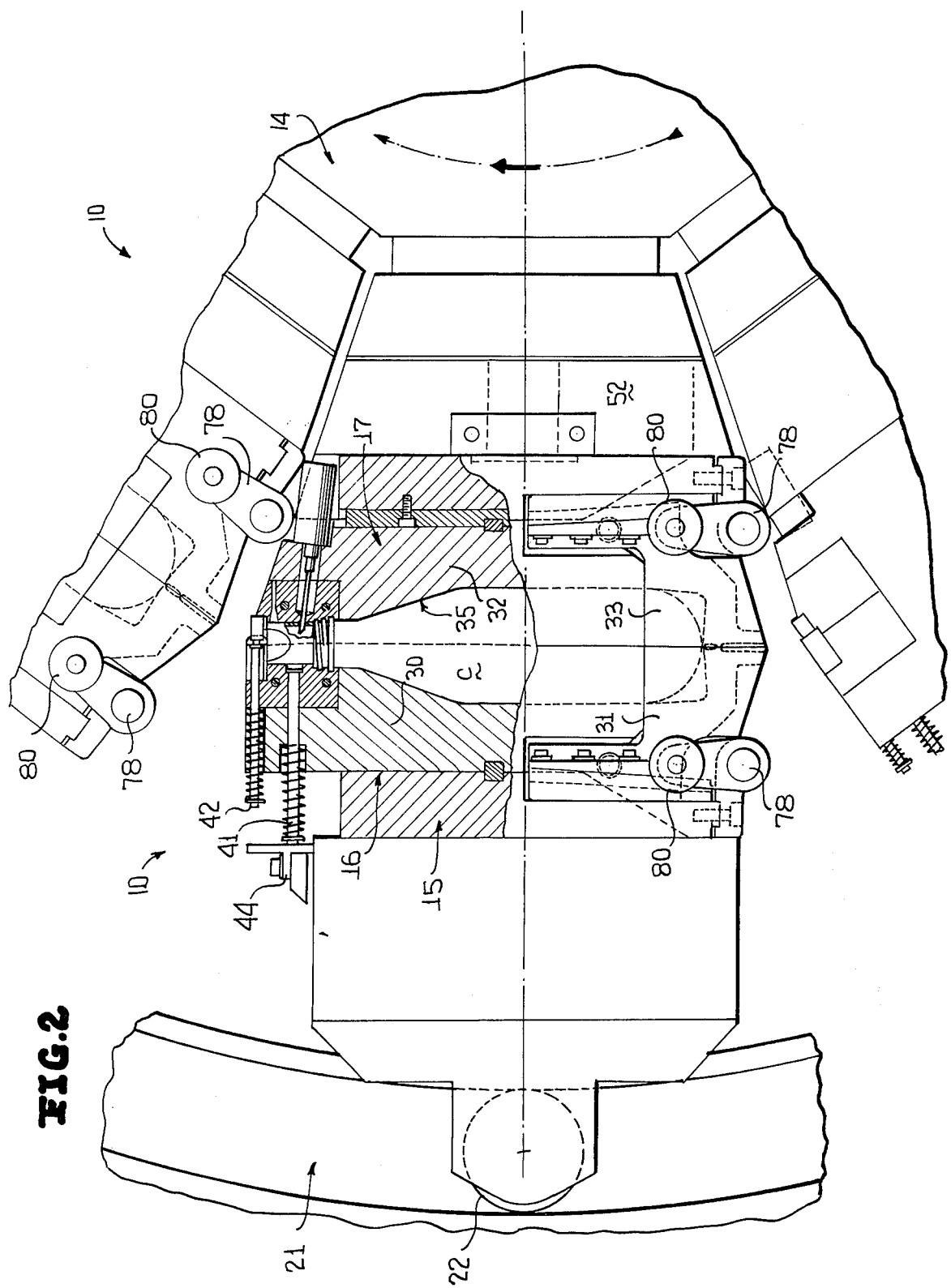
FIG. 2 is a fragmentary enlarged side elevational view with parts broken away for clarity, and illustrates a mold in the closed position thereof, means for separating a pair of mold bodies of the mold, and means for separating first and second sections of each mold body.
Figure 3:
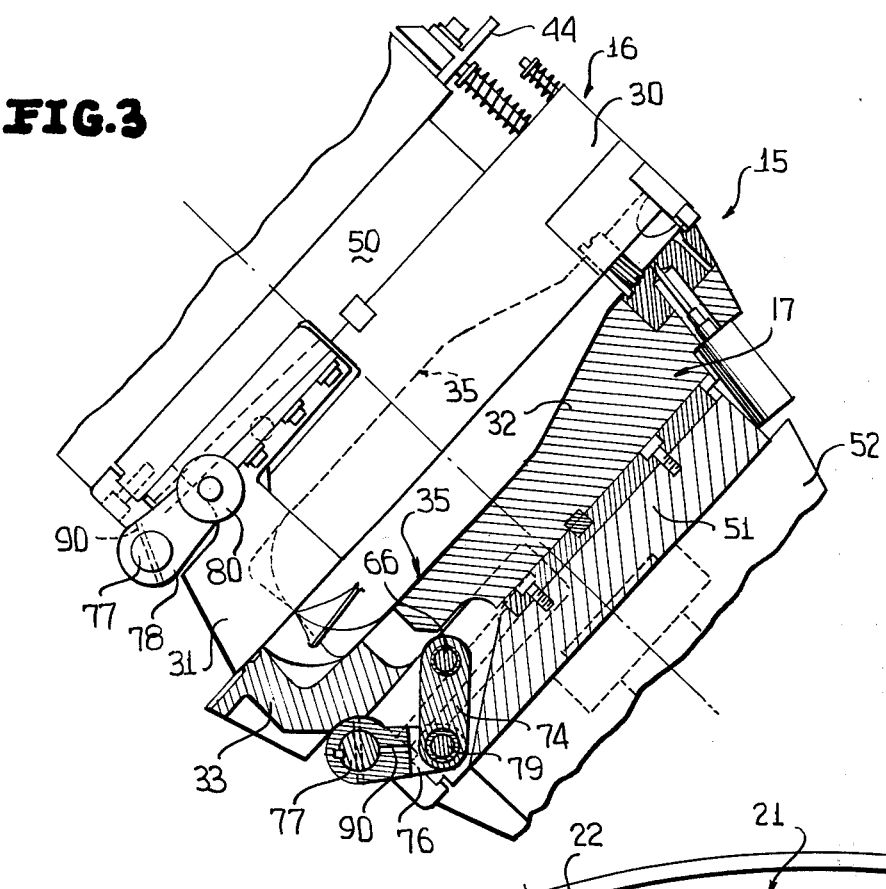
FIG. 3 is a fragmentary side elevational view partially in cross-section, similar to FIG. 2, but illustrates one of a pair of mold halves being separated longitudinally relative to the axis of the mold cavity and an article blow molded therein.
Figure 5:
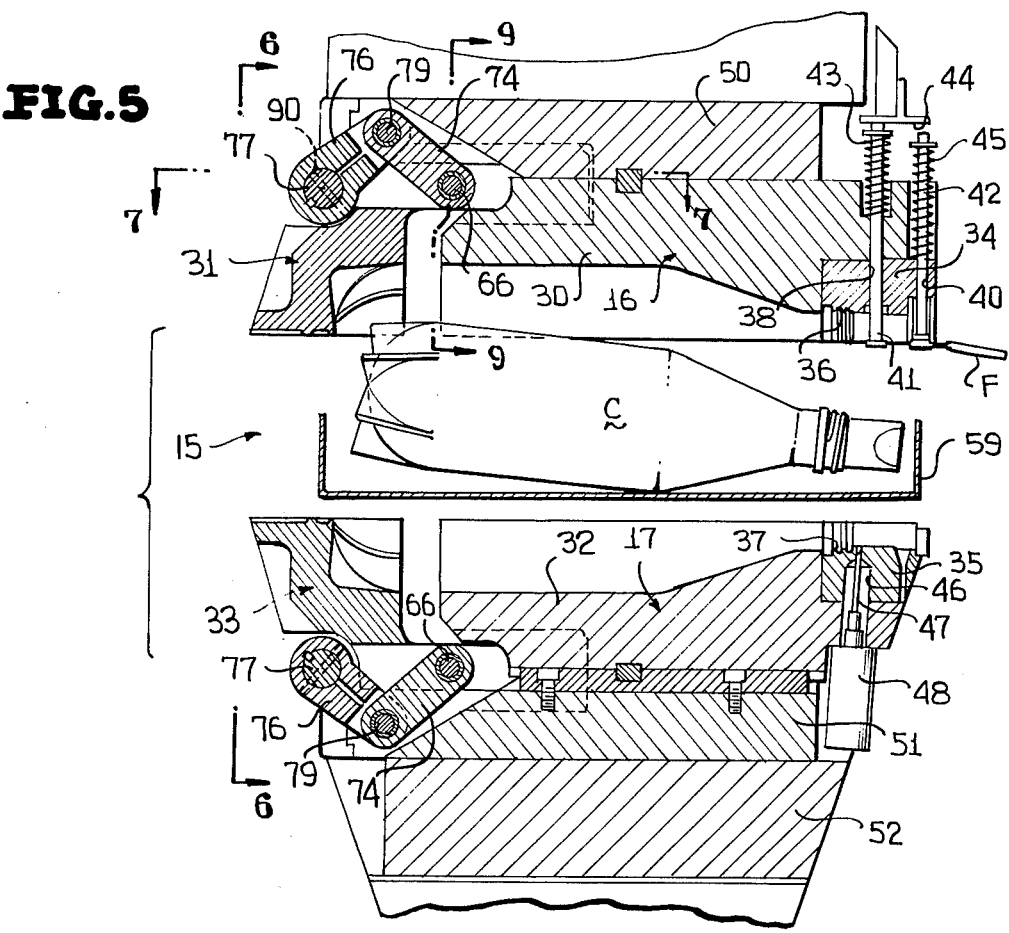
FIG. 5 is a fragmentary sectional view similar to FIG. 3, and illustrates both mold halves of a mold and the mold sections thereof in their fully opened position to facilitate the ejection of blow molded articles therefrom.
Figure 6:
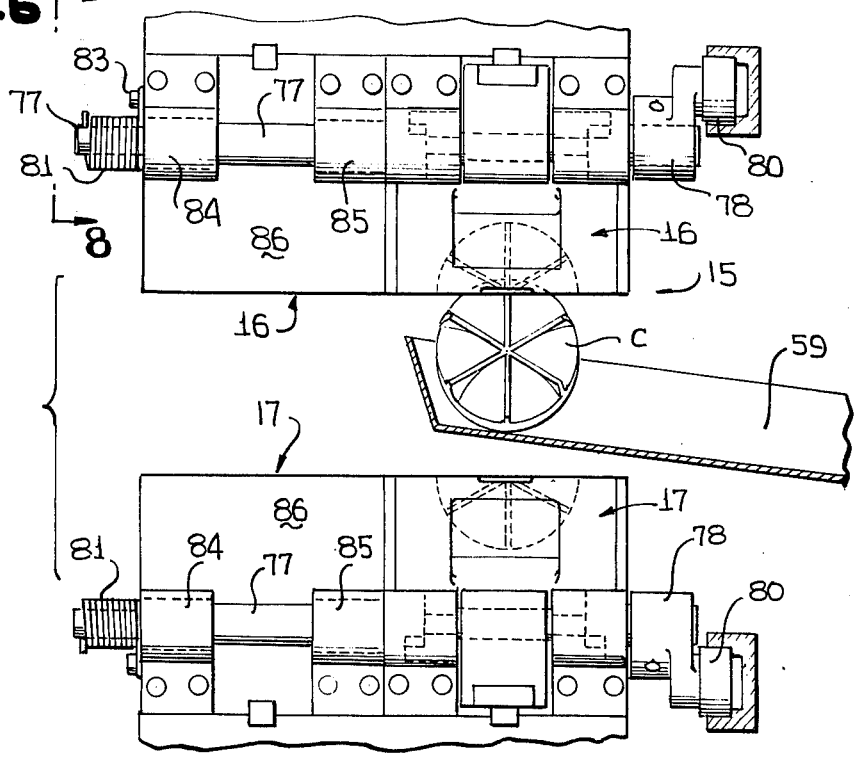
FIG. 6 is an end view taken along line 6—6 of FIG. 5, and illustrates a shaft to which is coupled a crank arm and cam follower biased by a torsion spring for both mold halves forming part of the mechanism for opening and closing the mold sections of each mold body.
Figure 7:
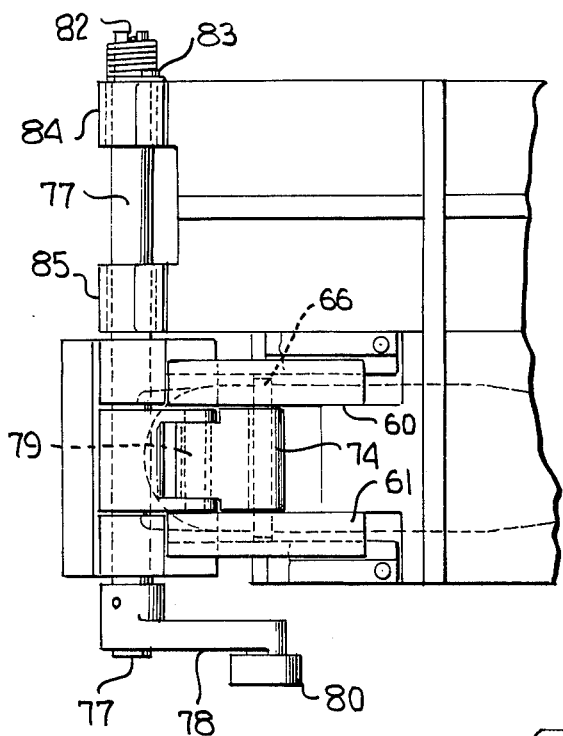
FIG. 7 is a fragmentary view taken along line 7—7 of FIG. 5, and illustrates the manner in which a pair of links are pivotally connected to each other and one of which is joined to the shaft carrying the crank arm and cam follower.
Figure 8:
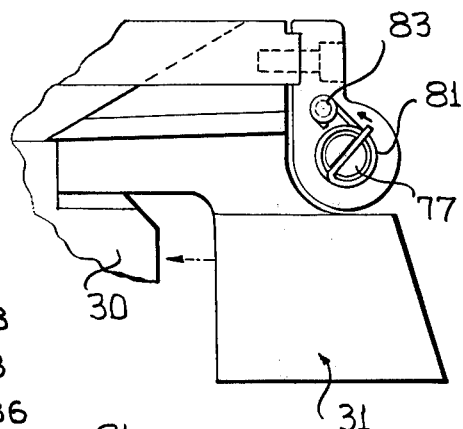
FIG. 8 is a side view taken along line 8—8 of FIG. 6, and illustrates the manner in which the torsion spring is connected to the associated shaft for imparting a closing motion to one of the pair of mold sections of each mold body.
Figure 9:
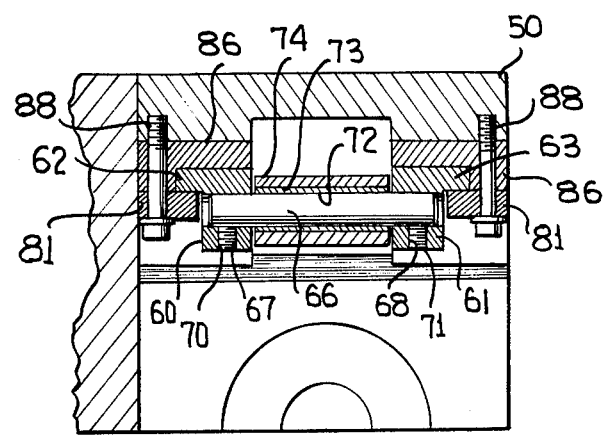
FIG. 9 is a sectional view taken generally along line 9—9 of FIG. 5, and illustrates the manner in which a mold section is mounted for sliding movement and pivoted to its associated link.
Figure 10:
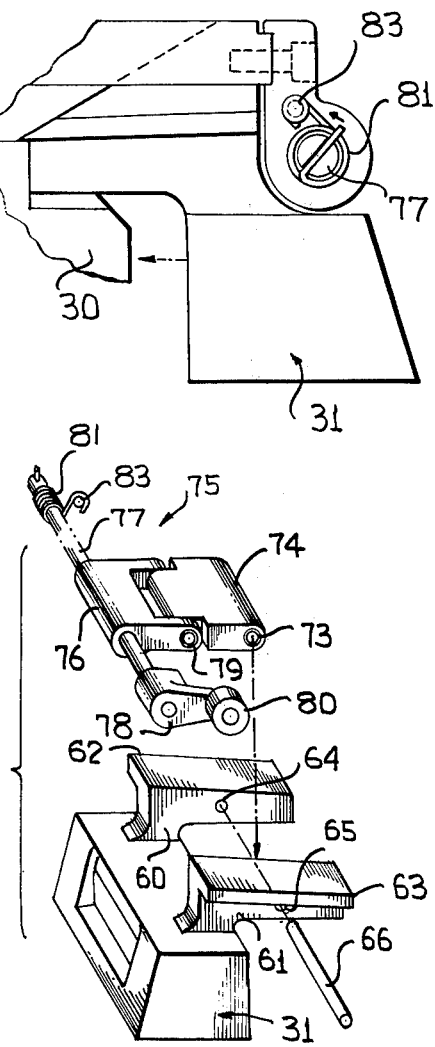
FIG. 10 is an exploded perspective view, and illustrates a mold section, the linkage associated therewith, the torsion spring, the crank arm and an associated cam follower carried by the latter.

Reference is now made to FIGS. 2, 3 and 5 of the drawings which illustrate the general construction of the mold bodies or halves 16, 17. The mold body 16 is formed of two sections 30, 31, and the mold body 17 is likewise constructed of two sections 32, 33. The mold sections 30 through 33 in the closed position thereof (FIG. 2) define a mold chamber or cavity 35 which is contoured to the configuration of the article or container C which is to be molded therebetween.

The mold sections 30, 32 include inserts 34, 35 which are respectively provided with an internal configuration 36, 37, which in the present embodiment of the invention, are screw threads which form the neck or finish of the eventually blow molded container C.

The insert 34 includes a pair of bores 38, 40 which receive respective rods 41, 42. The rod 41 is a knock-out rod for the container C which is blow molded in the chamber or cavity 35 and is normally biased by a spring 43 to a retracted position (FIG. 2). However, a stationary cam 44 positioned along the path of travel of the molds 15, engages the end (unnumbered) of the rod 41 remote from the insert 34 to move the rod 41 radially inwardly from the position shown in FIG. 2 to that shown in FIG. 5 to eject a blow molded container or similar article C from the mold cavity 35. In a like manner the rod 42 is biased by a spring 45 to its retracted position (not shown) and a cam similar to the cam 44 causes the rod 42 to be moved radially inwardly to remove flash material F (FIG. 5) from between adjacent molds 15, 15 during the blow molding operation.

The insert 35 carried by the mold half or body 17 is bored and counter-bored, collectively designated by the reference numeral 46, to receive a blow needle 47 reciprocally carried by a cylinder 48 which is conventionally coupled to a source of pressurized air such that upon the motion of the blow needle 47 radially inwardly the parison P is punctured and inflated to the configuration of the article or container C, and upon the retraction of the blow needle 47 the supply of compressed air is cut-off, and this cycle is repeated in a conventional manner.

Each mold half or body 30 is coupled by bolts to a plate 50 which in turn carries one of the cam followers or cam rollers 22. In a like manner each of the mold bodies 32 is connected to a plate 51 which in turn is joined to a spring pack 52 supported by the rotatable frame 14. Suitable supporting guide means (not shown) are provided for maintaining alignment between the supports 50, 51 and the molds 16, 17 carried thereby such that the same are maintained in accurate alignment in the closed position thereof (FIGS. 2 and 3), but upon retraction of the mold body 16 by virtue of its associated cam follower or roller 22 moving in the cam track portion 23, separation or opening of the mold bodies 16, 17 is effected to achieve the subsequent discharge of a blow molded article or container C from the cavity 35 therebetween, in the manner best illustrated in FIG. 5, at which time a suitable discharge chute 59 is provided for conveying each ejected or discharged article C to the succeeding station for additional operations, such as flash trimming, reaming, etc.

Reference is now made to FIGS. 5 through 10 of the drawings which illustrate the manner in which the mold sections 31, 33 are mounted for sliding movement relative to the mold sections 30, 32, as well as the linkage therebetween and means for effecting the latter-mentioned sliding motion. The mold sections 31, 33 are of identical constructions, and reference is made to FIG. 10 which illustrates the mold section 31 carrying a pair of legs 60, 61 having oppositely directed flanges 62, 63. The legs 60, 61 includes bores 64, 65 housing a shaft 66. Each leg 60, 61 has a threaded bore 67, 68 (FIG. 9) which receives a respective set screw 70, 71. The set screws 70, 71 anchor the legs 60, 61, respectively, to ends (unnumbered) of the shaft 66 which is received in a bushing 72 of a bore 73 formed in a link 74 of a linkage mechanism generally designated by the reference numeral 75. The linkage mechanism 75 includes another link 76 through a bore of which passes a shaft 77 fixed to the link 76. The link 76 has bifurcated arms (unnumbered) through which pass a pin 79 which also passes through a bore (unnumbered) of the link 74. A shaft 77 has fixed at one end a crank arm 78 carrying a cam follower or cam roller 80 and at an opposite end a torsion spring 81 surrounds the shaft 77. An end of the torsion spring 81 is locked in a groove 82 (FIG. 7) of the shaft 77, while an opposite end (unnumbered) of the torsion spring 81 partially surrounds a shank (unnumbered) of a screw or bolt 83 fastened in an outermost journal 84 of a pair of journals 84, 85 which rotatably receive therein the shaft 77. The journals 84, 85 are suitably connected to a "dummy" mold 86 (FIG. 6) which is fastened to the support 50 in the same manner as the mold section 30 is fastened thereto. The "dummy" mold is simply a blank mold which, in effect, forms a "filler" when the machine 10 is being operated such that a single extruder extrudes a single parison P only between the mold halves or bodies 16, 17. However, the construction of the apparatus 10 is such that the dummy molds 86 can be removed and molds corresponding to those of the molds 16, 17 can be substituted therefore such that upon the extrusion of twin parisons P a pair of parisons are clamped off between each of two adjacent pair of mold halves 16, 17 and during a single cycle of the machine 10 two, rather than one, containers C are blow molded.

The flanges 62, 63 of each of the mold sections 31, 33 is received between a pair of plates 86, 87 (FIG. 9) fixed by bolts 88 to the respective supports 50, 51. The flanges 62, 63 can therefore slide between the plates 86, 87 between the opened position thereof illustrated in FIG. 5 and the bottom half of FIG. 3 and the closed position illustrated in FIG. 2 and the top half of FIG. 3.

Each crank arm 78 is coupled to its associated shaft 77 by a shear pin 90 (FIG. 5) so that should jamming occur during the operation of the machine 10 any force applied to any of the crank arms 78 through the associated cam followers 80 will shear the pin 90 associated therewith, rather than causing destruction of the linkage mechanism 75 or the structure associated therewith.

Figure 4:
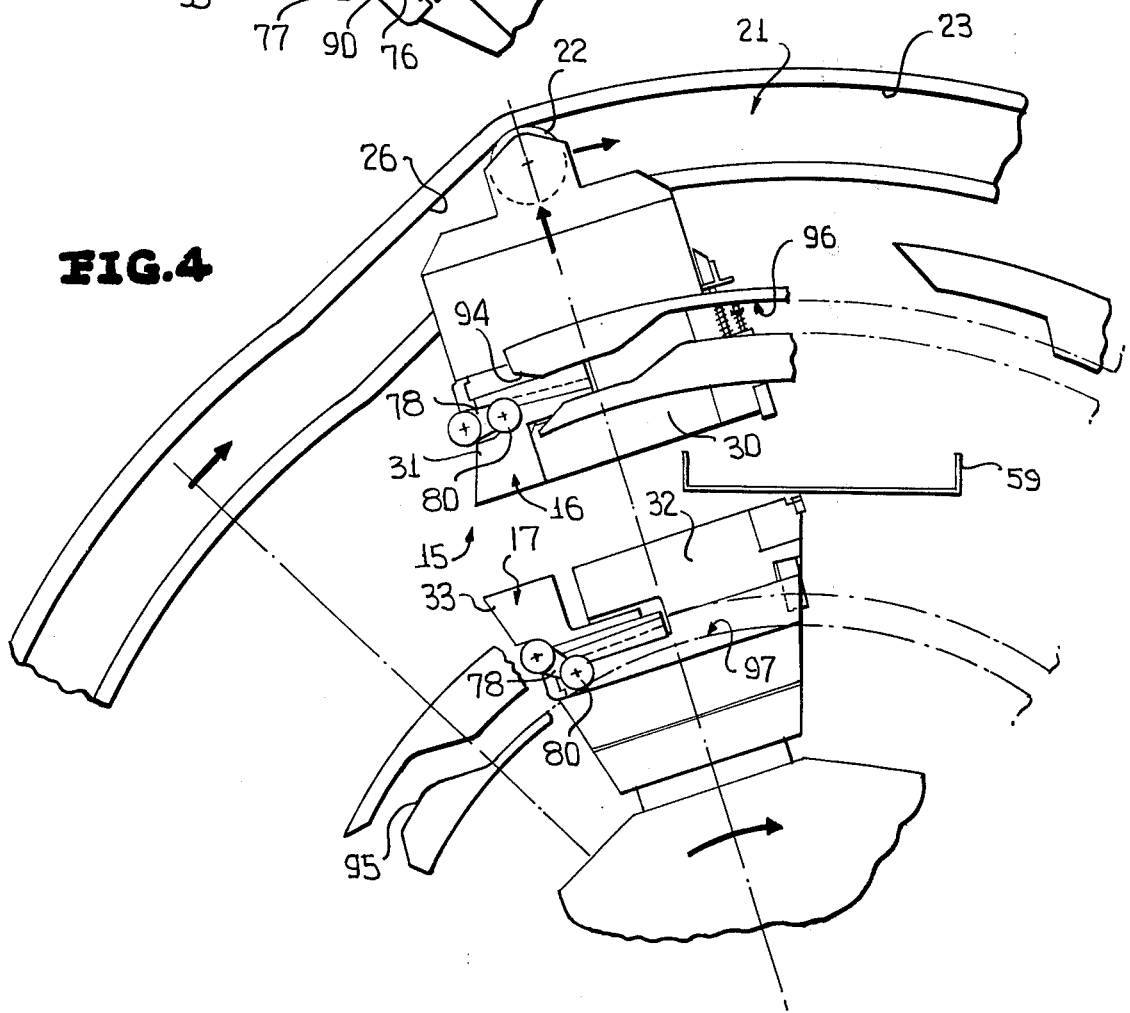
FIG. 4 is a fragmentary side elevational view in a reduced scale similar to FIG. 2, and illustrates the manner in which cam tracks are provided for separating each mold half of each mold, as well as the mold sections of each mold half during a cycle of the blow molding machine.

The cam rollers or followers 80 associated with the mold segments 31, 32 are aligned to be received in entrance end portions 94, 95 (FIG. 4) of fixed cam tracks 96, 97, respectively. As is best illustrated in FIG. 4, the entrance end portion 95 of the cam track 97 is upstream of the entrance end portion 94 of the cam track 96. Thus, as the closed mold bodies 16, 17 rotated in a clockwise direction (FIGS. 1 and 4) the cam roller or follower 80 of the mold section 33 first reaches and is guided into the entrance end portion 95 of the cam track 97. Due to the configuration of the cam track 97 and the motion of the cam roller or follower 80 therealong, the crank arm 78 associated therewith is rotated in a clockwise direction, as viewed in FIG. 4, and the motion thereto imparted through the shaft 77 draws the links 74, 76 from the inline position thereof (FIG. 2) to the relative angular position shown in FIG. 3 to elongate or lengthen the predetermined length of the cavity or chamber 35 as the mold sections 32, 33 separate relative to each other. At this point the mold halves 16, 17 have not begun to separate from each other since the cam follower or roller 22 associated with the mold body 16 has not yet reached the cam track portion 26 (FIG. 1).

After the opening of each mold section 33 the cam follower or roller 22 of each mold section 33 reaches the cam track portion 26 of the cam track 21 and draws each cam body 16 away from its associated cam body 17 thus opening the sections 30, 32 relative to each other after the associated mold section 33 has been slid open, but before the mold section 31 has been moved from its closed position (FIG. 3). During the progressive rotation imparted to the molds 15 the cam follower or roller 80 associated with each mold section 31 approaches and is received in the leading cam track portion 94 of the stationary cam 96 and, as viewed in FIG. 4, during the progressive relative motion therebetween the crank arm 78 thereof is rotated in a clockwise direction resulting in the relative sliding motion between the mold sections 30, 31 thus moving these to the open position thereof (FIG. 5). At this point each blown article or container C is freed for discharge but may "stick" to the interior of the mold cavity portion (unnumbered) defined by the mold sections 30, 31. It is at this point that the ejector rod 41 contacts the cam 44 (FIGS. 4 and 5) resulting in the radially inward movement of each rod 41 to eject the container C upon the conveyor or chute 59 for discharge for subsequent operations. Thereafter the same cam track 44 depresses the rod 41 so that any scrap material retained between adjacent molds 15 is ejected upon a conveyor or chute 100 (FIG. 1) with the scrap material being generally designated by the reference numeral S.

TOTAL OPERATION

Reference is made to FIG. 1 of the drawings in which the mold halves 16, 17 of the plurality of molds 15 are illustrated in the open position thereof. A parison P is extruded in tubular form from a conventional extruder 18 and thereafter as the cam followers 22 follow the cam track portion 24 the mold halves 16, 17 are moved relative to each other to the closed position thereof clamping a segment (unnumbered) of the parison P between each other. At the 4:00 o'clock position the mold halves or bodies 16, 17 are closed and thereafter the blow needle 47 is inserted into the parison P and under pressure inflates each parison P until the same is contoured to the generally closed configuration of the mold bodies 16, 17 to form the article or container C, as is best illustrated at the generally 9:00 o'clock position of FIG. 1. The mold sections 30, 31, 32 and 33 are provided with bores or conduits through which cooling media is circulated to cool the blow molded article C to solidify the same prior to the ejection thereof from the mold cavity 35. Prior to reaching the portion 26 of the cam track 21 the cam follower 80 of the radially innermost mold section 33 is actuated by the cam track 97 to cause rotation of the crank arm 78 thereof which causes relative sliding motion between the mold section 33 and its adjacent section 32 whereupon the container C is freed for ejection at its lowermost or radially innermost position. However, at this time the blown container C cannot be ejected nor can it be discharged simply by free fall or gravity because it is confined between the mold sections 30, 31. As is best illustrated in FIG. 3, even though the radially innermost mold section 33 has been slid to the left, as viewed in this Figure, to release the lower left-hand portion of the container C, the undercut (unnumbered) of the mold insert 31 retains the container C captive between the sections 30, 31. Thus, by initially releasing the mold section 33 the bottom mold sections 32, 33 freely are removed from confining the container C and the latter is in effect removed radially outwardly from therebetween while being confined within the remaining portion of the mold cavity 35, as defined by the remaining closed sections 30, 31 of the mold bodies 16, 17. Thus, after the mold sections 33 have been in effect expanded or slid to the open position thereof each container C is still retained or confined or held between the mold sections 30, 31. After the spreading or sliding open of the mold sections 32, 33, the mold bodies 16, 17 are radially moved relative to each other upon the motion of the cam followers or rollers 32 upon the inclined portion 26 of the cam track 21. At this point each blown container C is still retained by the upper mold bodies 16, and specifically retained between the mold sections 30, 31 thereof. However, upon the cam rollers or followers 80 of the mold sections 31 being received within the entrance end portions 94 of the cam tracks the crank arms 78 thereof are progressively rotated or pivoted in a clockwise direction, as viewed in FIGS. 1, 3 and 4, resulting in the relative sliding motion imparted between the mold sections 30, 31. At this point, generally at the 11:00 o'clock position, the mold sections 30 through 33 are in the position illustrated in FIG. 5 of the drawings and under normal conditions each container C simply drops by the influence of gravity upon and into the chute 59. However, should this not occur under normal conditions the ejector rod 41 will be depressed radially inwardly by the cam 44 and the container C will be ejected upon the chute 59. Immediately thereafter any scrap or flash material F which is retained between adjacent molds 15 will be ejected as the rod 42 is depressed radially inwardly by the same cam 44 (FIGS. 1 and 4). The scrap S will be, as noted earlier, discharged and ejected along the chute 100. Thereafter the molds 15 continue in their open position (2:00 o'clock) until again reaching approximately the 3:00 o'clock position at which once again a parison P is extruded therebetween and the cycle is repeated.

While preferred forms and arrangements of parts have been shown in illustrating the invention, it is to be clearly understood that various changes in detail and arrangement of parts may be made without departing from the spirit and scope of this disclosure.

I claim:

1. Apparatus for blow molding articles comprising a plurality of molds, means for moving said molds along a continuous path of travel, each mold being defined by a pair of mold bodies which define a mold chamber of a predetermined configuration, means for relatively moving each pair of mold bodies between open and closed positions thereof, means for extruding a tubular parison between each pair of mold bodies while in the open position thereof, means for expanding each tubular parison to the configuration of its associated chamber when the mold bodies are in their closed position, each mold being defined by first and second mold sections, means coupling each first and second mold section for movement relative to each other, means for imparting movement to one of said first and second mold sections of each pair of mold bodies to increase the size of said mold chamber thereby facilitating the discharge of the blown parisons therefrom, and said movement imparting means successively moves a first of said mold sections relative to its associated second mold section of a first of said mold bodies while said mold bodies are in their closed position, thereafter moving said mold bodies away from each other, and thereafter moving a first of said mold sections relative to its associated second mold section of a second of said mold bodies.

2. The apparatus as defined in claim 1 wherein said movement imparting means imparts relative straight line sliding motion between each first and second mold section.

3. The apparatus as defined in claim 1 wherein said movement imparting means imparts relative sliding motion between each first and second mold section.

4. The apparatus as defined in claim 1 wherein said movement imparting means includes a cam follower carried by each one mold section and a stationay cam track for the cam follower of said one mold section of each mold body.

5. The apparatus as defined in claim 1 wherein said movement imparting means includes a cam follower carried by each one mold section, a stationary cam track for the cam follower of said one mold section of each mold body, and said cam tracks are offset from each other in the direction of mold movement along said path of travel whereby said one mold sections of each pair of mold bodies move successively.

6. The apparatus as defined in claim 1 including torsion spring means for biasing each of said first and second mold sections relatively toward each other and toward said predetermined configuration.

7. The apparatus as defined in claim 1 wherein said movement imparting means includes a pair of links pivotally connectd to each one mold section and to a cam follower, and a stationary cam track for the cam follower of said one mold section of each mold body.

8. The apparatus as defined in claim 1 wherein said movement imparting means includes a pair of links pivotally connected to each one mold section and to a cam follower, a stationary cam track for the cam follower of said one mold section of each mold body, and said cam tracks are offset from each other in the direction of mold movement along said path of travel whereby said one mold sections of each pair of mold bodies move successively.

9. The apparatus as defined in claim 1 wherein said movement imparting means imparts relative straight line sliding motion between each first and second mold section.

10. The apparatus as defined in claim 1 wherein said movement imparting means includes a cam follower carried by each one mold section, and a stationary cam track for the cam follower of said one mold section of each mold body.

11. The apparatus as defined in claim 1 including torsion spring means for biasing each of said first and second mold sections relatively toward each other and toward said predetermined configuration.

12. The apparatus as defined in claim 2 wherein said sliding motion is coincident with said path of travel.

13. The apparatus as defined in claim 2 wherein said movement imparting means includes a cam follower carried by each one mold section, a stationary cam track for the cam follower of said one mold section of each mold body.

14. The apparatus as defined in claim 2 including torsion spring means for biasing each of said first and second mold sections relatively toward each other and toward said predetermined configuration.

15. The apparatus as defined in claim 1 wherein said movement imparting means imparts relative sliding motion between each first and second mold section, and said sliding motion is coincident with said path of travel.

* * * * *